(12) United States Patent
Takabayashi

(10) Patent No.: US 8,428,399 B2
(45) Date of Patent: Apr. 23, 2013

(54) OPTICAL MODULE, MANUFACTURING METHOD THEREOF, AND OPTICAL TRANSMITTER

(75) Inventor: Kazumasa Takabayashi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 406 days.

(21) Appl. No.: 12/639,068

(22) Filed: Dec. 16, 2009

(65) Prior Publication Data

US 2010/0158540 A1  Jun. 24, 2010

(30) Foreign Application Priority Data

Dec. 22, 2008  (JP) ................. 2008-326381

(51) Int. Cl.
*G02F 1/035* (2006.01)
*G02B 6/26* (2006.01)
(52) U.S. Cl.
USPC .................................... 385/2; 385/40
(58) Field of Classification Search .......... 385/2, 40
See application file for complete search history.

(56) References Cited

U.S. PATENT DOCUMENTS

| | | | | |
|---|---|---|---|---|
| 5,278,923 A | * | 1/1994 | Nazarathy et al. | 385/3 |
| 5,991,471 A | * | 11/1999 | Yu | 385/3 |
| 6,149,789 A | * | 11/2000 | Benecke et al. | 204/547 |
| 6,522,792 B1 | * | 2/2003 | Sugamata et al. | 385/2 |
| 6,872,966 B2 | * | 3/2005 | Akiyama et al. | 257/14 |
| 7,321,702 B2 | * | 1/2008 | Akiyama et al. | 385/3 |
| 7,340,116 B2 | * | 3/2008 | Toyoda et al. | 385/9 |
| 7,603,002 B2 | * | 10/2009 | Sugiyama | 385/3 |
| 2004/0016920 A1 | * | 1/2004 | Akiyama et al. | 257/14 |
| 2004/0247220 A1 | * | 12/2004 | Bosso et al. | 385/2 |
| 2005/0254743 A1 | * | 11/2005 | Akiyama et al. | 385/3 |
| 2006/0210212 A1 | * | 9/2006 | Sugiyama | 385/3 |

FOREIGN PATENT DOCUMENTS

| | | |
|---|---|---|
| JP | 2004-053830 A | 2/2004 |
| JP | 2006-065085 A | 3/2006 |
| JP | 2007-531022 A | 11/2007 |
| JP | 2008-170831 A | 7/2008 |
| WO | WO2005/096086 A1 | 10/2005 |
| WO | WO-2008/051429 A2 | 5/2008 |

OTHER PUBLICATIONS

Japanese Office Action mailed Sep. 25, 2012 for corresponding Japanese Application No. 2008-326381, with Partial English-language Translation.

* cited by examiner

*Primary Examiner* — K. Cyrus Kianni
(74) *Attorney, Agent, or Firm* — Fujitsu Patent Center

(57) ABSTRACT

An optical module including a first optical coupler; a second optical coupler; a first optical waveguide; a second optical waveguide; a first electrode provided on the first optical waveguide; a second electrode provided on the second optical waveguide; a short electrode shorter than the first and second electrodes and provided on the second optical waveguide; and a first high-frequency connector and a second high-frequency connector; wherein, the short electrode provided on the second optical waveguide is coupled to the second high-frequency connector; and the first electrode provided on the first optical waveguide is coupled to the first high-frequency connector.

9 Claims, 15 Drawing Sheets

OPTICAL MODULE, MANUFACTURING METHOD THEREOF, AND OPTICAL TRANSMITTER

CROSS-REFERENCE TO RELATED APPLICATIONS

This application is based upon and claims the benefit of priority of the prior Japanese Patent Application No. 2008-326381, filed on Dec. 22, 2008, the entire contents of which are incorporated herein by reference.

FIELD

This invention relates to an optical module, the manufacturing method thereof, and an optical transmitter.

BACKGROUND

In optical communication systems, a wavelength-division multiplexing (WDM) communication method is employed that transmits optical signals with multiple different wavelengths in one optical fiber. The WDM communication method has increased communication capacity dramatically.

In the WDM communication method, an optical transmitter that allows transmitting of an optical signal with a wide wavelength range is desirable. In order to achieve such an optical transmitter, an optical modulator that operates with high-speed (for example, modulation speed of about 10 Gbps) in a wide wavelength range is desirable.

As a modulator that operates in a wide wavelength range, there is a Mach-Zehnder (MZ) type modulator (Refer to FIG. 1).

In the MZ type modulator, aligning phases between two waveguides that make up an interferometer by manufacturing is difficult due to the influence of manufacturing errors, etc. Thus, some MZ type modulators include not only an electrode for applying a high-frequency signal voltage but also an electrode for adjusting a phase with the length shorter than the electrode for applying a high-frequency signal voltage (Refer to FIG. 2).

In order to adjust chirp, there is a MZ type modulator in which high-frequency electrodes for applying high-frequency signal voltages with different lengths are formed on two waveguides respectively that make up an interferometer (refer to FIG. 3).

The following are examples of related art of the present invention: U.S. Pat. No. 5,991,471 and Japanese Patent Application Publication No. 2007-531022.

As described above, when electrodes for applying high-frequency signal voltages with different lengths are provided, devices with different structures needs to be provided for an devices for zero-chirp operation and for an devices for positive or negative chirp operation. In other words, electrodes with the same length need to be provided as devices for zero-chirp operation on two waveguides that make up an interferometer, and electrodes with the length of one electrode longer than the other electrode need to be provided for positive or negative chirp operation on two waveguides that make up the interferometer.

However, manufacturing of devices takes a few months. Therefore manufacturing of devices with different structures (specification) is not desirable in terms of yield or inventory management.

SUMMARY

Accordingly, it is an object of an aspect of the invention to provide an optical module including a first optical coupler including at least one input port and a first output port and a second output port; a second optical coupler including at least a first input port and a second input port, and at least one output port; a first optical waveguide, one end of which is coupled to the first output port and the other end of which is coupled to the first input port; a second optical waveguide one end of which is coupled to the second output port and the other end of which is coupled to the second input port; a first electrode provided on the first optical waveguide; a second electrode provided on the second optical waveguide; a short electrode shorter than the first and second electrodes and provided on the second optical waveguide; and a first high-frequency connector and a second high-frequency connector; wherein, the short electrode provided on the second optical waveguide is coupled to the second high-frequency connector; and the first electrode provided on the first optical waveguide is coupled to the first high-frequency connector.

According to another aspect of the invention, an optical transmitter includes a first optical coupler including at least one input port, and a first output port and a second output port; a second optical coupler including a first input port and a second input port, and at least one output port; a first optical waveguide, one end of which is coupled to the first output port and the other end of which is coupled to the first input port; a second optical waveguide, one end of which is coupled to the second output port and the other end of which is coupled to the second input port; a first electrode provided on the first optical waveguide; a second electrode provided on the second optical waveguide; a short electrode shorter than the first and second electrodes and provided on the second optical waveguide; a high-frequency power supply that is coupled to the short electrode provided on the second optical waveguide, and to the first electrode provided on the first optical waveguide.

According to another aspect of the invention, a method for manufacturing an optical module includes disposing a Mach-Zehnder (MZ) type modulation device in a package that includes a first high-frequency connector and a second high-frequency connector, the Mach-Zehnder (MZ) type modulation device including: a first optical coupler including at least one input port, and a first output port and a second output port; a second optical coupler including a first input port and a second input port, and at least one output port; a first optical waveguide, one end of which is coupled to the first output port and the other end of which is coupled to the first input port; a second optical waveguide, one end of which is coupled to the second output port and the other end of which is coupled to the second input port; a first electrode provided on the first optical waveguide; a second electrode provided on the second optical waveguide; and a short electrode shorter than the first and second electrodes and provided on the second optical waveguide; and coupling the short electrode provided on the second optical waveguide to the second high-frequency connector; and coupling the electrode provided on the first optical waveguide to the first high-frequency connector.

According to another aspect of the invention, a method for manufacturing an optical module includes disposing a Mach-Zehnder (MZ) type modulation device in a package that includes a first high-frequency connector and a second high-frequency connector, the Mach-Zehnder (MZ) type modulation device including a first optical coupler including at least one input port, and a first output port and a second output port; a second optical coupler including at least a first input port and a second input port, and at least one output port; a first optical waveguide, one end of which is coupled to the first output port and the other end of which is coupled to the first input port; a second optical waveguide, one end of which is coupled to the second output port and the other end of which is coupled to the second input port; a first electrode provided on the first optical waveguide; a second electrode provided on the second optical waveguide; and a short electrode shorter than the first and second electrodes and provided on the second optical waveguide; coupling the first electrode provided on the first waveguide to the first high-frequency connector and the second electrode provided on the second waveguide to the second high-frequency connector when an optical module for zero-chirp operation is manufactured; and coupling the short electrode provided on the second optical waveguide to the second high-frequency connector, and coupling the first electrode provided on the first optical waveguide to the first high-frequency connector when an optical module for positive chirp operation or negative chirp operation is manufactured.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 12A illustrates a relationship among a bias voltage, an amplitude of a high-frequency signal voltage, and a phase change amount under a standard drive condition. FIG. 12B illustrates a phase change amount when an amplitude of a high-frequency signal voltage is set smaller than the standard drive condition. FIG. 12C illustrates a phase change amount when a bias voltage is set higher than the standard drive condition;

DESCRIPTION OF EMBODIMENTS

An optical module according to this embodiment may be used, for example, as a light source for communication in a WDM system, and included in a Mach-Zehnder (MZ) type modulator (MZ type modulator) that operates in a wide wavelength range with high-speed.

Figure 4:
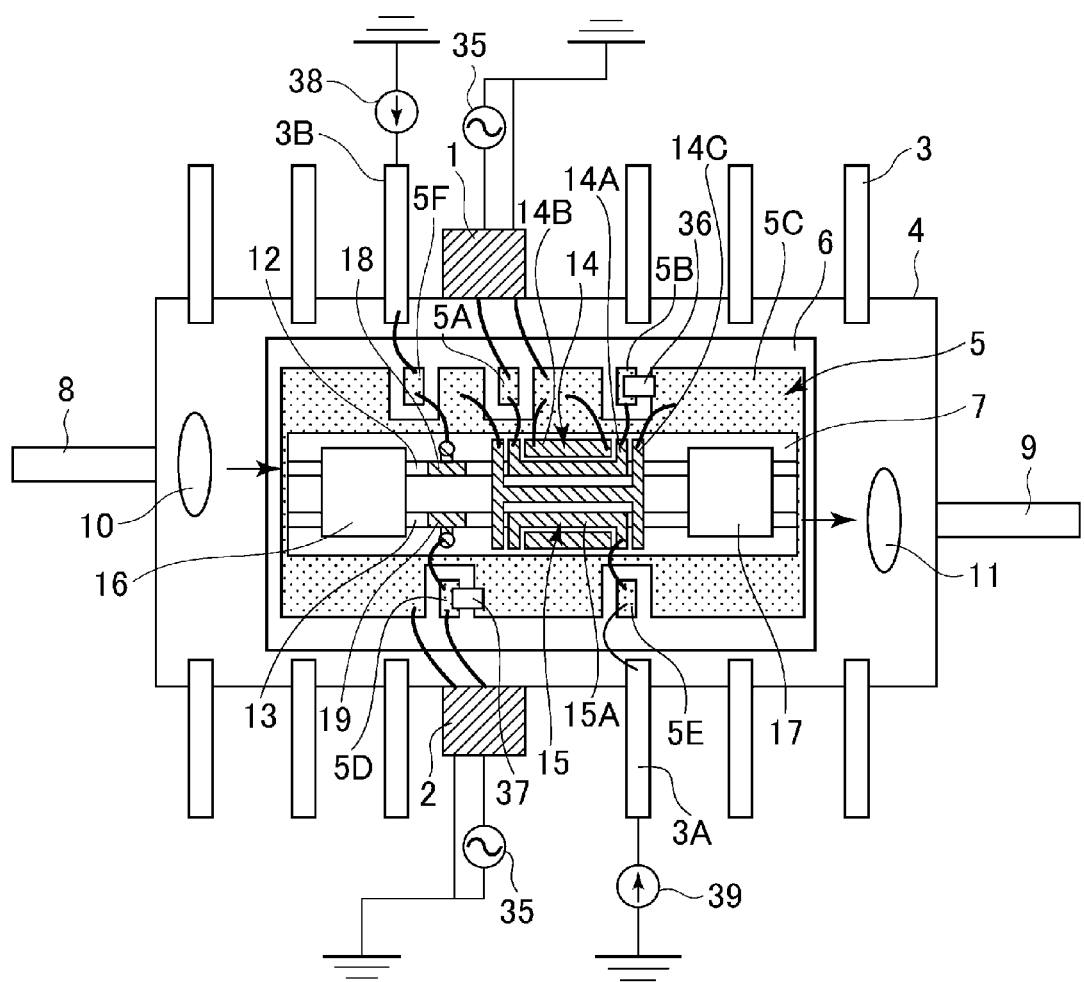
FIG. 4 illustrates a plain view of a configuration of an optical module (modulator module for negative chirp (or positive chirp) operation and an optical transmitter (optical modulator) according to an embodiment of this disclosure.

An optical module of this embodiment includes, as illustrated in FIG. 4, a package 4 that includes two high-frequency connectors 1 and 2 and a plurality of DC connectors (direct current connectors) 3, and a carrier 6 that includes a wiring 5 provided within the package 4, and a Mach-Zehnder type modulation device (MZ type modulation device) 7 provided over the carrier 6.

As illustrated in FIG. 4, the package 4 includes an input-side optical fiber 8 that is coupled to an input-side of the package 4 and an output-side optical fiber 9 that is coupled to an output-side of the package 4, an input-side lens 10 that is located between the input-side optical fiber 8 and the Mach-Zehnder (MZ) type modulation device 7, and an output-side lens 11 that is located between the output-side optical fiber 9 and the Mach-Zehnder (MZ) type modulation device 7. An input signal input from the input-side optical fiber 8 is input to the MZ type modulation device 7 via the input-side lens 10. An output signal from the Mach-Zehnder (MZ) type modulation device 7 is output to the output-side optical fiber 9 via the output-side lens 11.

According to this embodiment, as the Mach-Zehnder (MZ) type modulation device 7, a MZ type modulation device for zero-chirp operation is used in which electrodes (high-frequency electrodes) with approximately identical lengths for applying high-frequency signals (a high-frequency voltage) are formed on two waveguides that make up a MZ interferometer.

Figure 6:
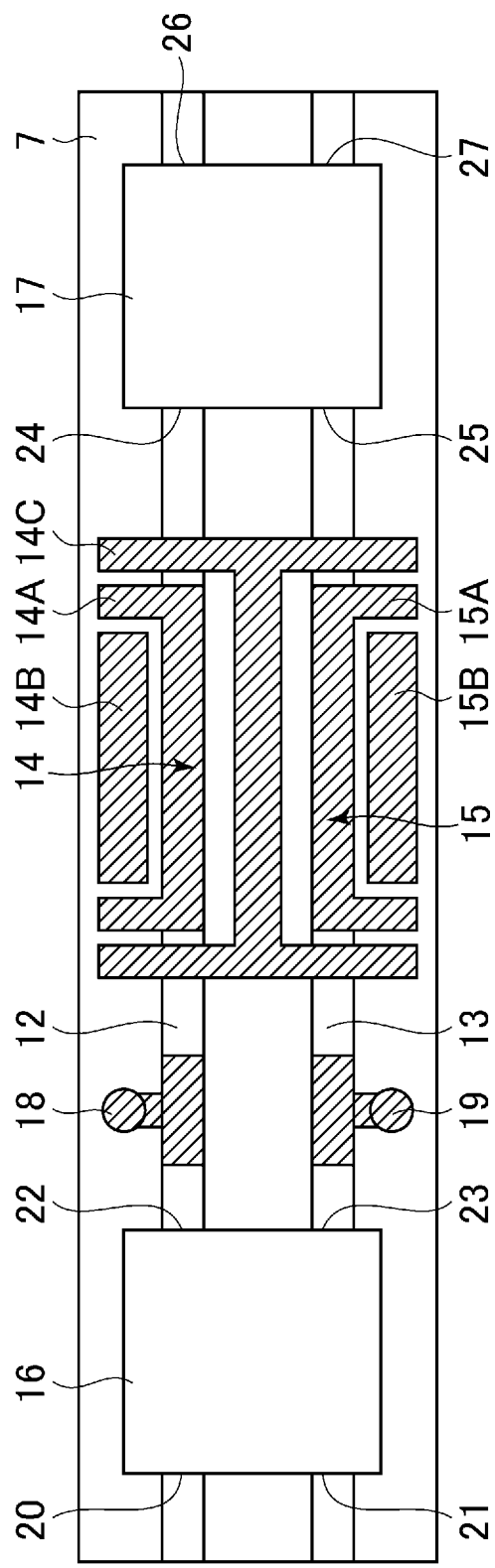
FIG. 6 illustrates a plain view of a configuration of the MZ type modulation device (for zero-chirp operation) according to an embodiment of this disclosure.

The MZ type modulation device 7 is a MZ type modulation device with electrodes for adjusting phases, and, as illustrated in FIG. 6, includes a first optical waveguide 12, a second optical waveguide 13, an input-side optical coupler (a first optical coupler) 16, and an output-side optical coupler (a second optical coupler) 17 that make up the MZ interferometer. The first optical waveguide 12 is provided with a first electrode (high-frequency electrode) 14 for applying a high-frequency signal, and a short electrode (electrode for adjusting a phase) 18 for adjusting a phase. The second optical waveguide 13 is provided with a second electrode (high-frequency electrode) 15 for applying a high-frequency signal and a short electrode (electrode for adjusting a phase) 19 for adjusting a phase.

The input-side optical coupler 16 includes, for example, two input ports 20 and 21 and two output ports 22 and 23 (for example, a 2×2 multimode interference (MMI) coupler).

The output-side optical coupler 17 includes, for example, two input ports 24 and 25 and two output ports 26 and 27 (for example, a 2×2 multimode interference (MMI) coupler).

One end of the first optical waveguide 12 is coupled to one of output ports (the first output port) 22 of the input-side optical coupler 16, and the other end of the first optical waveguide 12 is coupled to one of input ports (the first input port) 24 of the output-side coupler 17.

One end of the second optical waveguide 13 is coupled to the other output port (a second output port) 23 of the input-side optical coupler 16, and the other end of the second optical waveguide 13 is coupled to the other input port (a second input port) 25 of the output-side optical coupler 17.

The first electrode 14 and the second electrode 15 are traveling-wave-type electrodes, the structures of which are designed to be suitable for applying high-frequency signals. Here, the first electrode 14 and the second electrode 15 are, for example, coplanar type traveling-wave electrodes. As illustrated in FIG. 6, the first electrode 14 includes signal electrode 14A, and the second electrode 15 includes signal electrode15A. Ground electrodes 14B, 14C, and 15B are provided on both sides of the signal electrodes 14A and 15A.

The length along optical waveguides (working length) of the first electrode 14 provided on the first optical waveguide 12 and the second electrode provided on the second optical waveguide 15 are approximately the same.

The short electrodes 18 and 19 are, for example, lumped constant type electrodes. The length along optical waveguides (working length) of the short electrode 18 and that of the short electrode 19 provided on both the first optical waveguide 12 and the second optical waveguide 13 are approximately the same. The short electrode 18 and the short electrode 19 are provided separately from the first electrode 14 and the second electrode 15, and the short electrode 18 is shorter than the first electrode 14 and the short electrode 19 is shorter than the second electrode 15. Hereinafter, the first electrode 14 and the second electrode 15 may be called long electrodes (large electrodes) and the short electrode 18 and the short electrode 19 may be called short electrodes (small electrodes).

Figure 7:
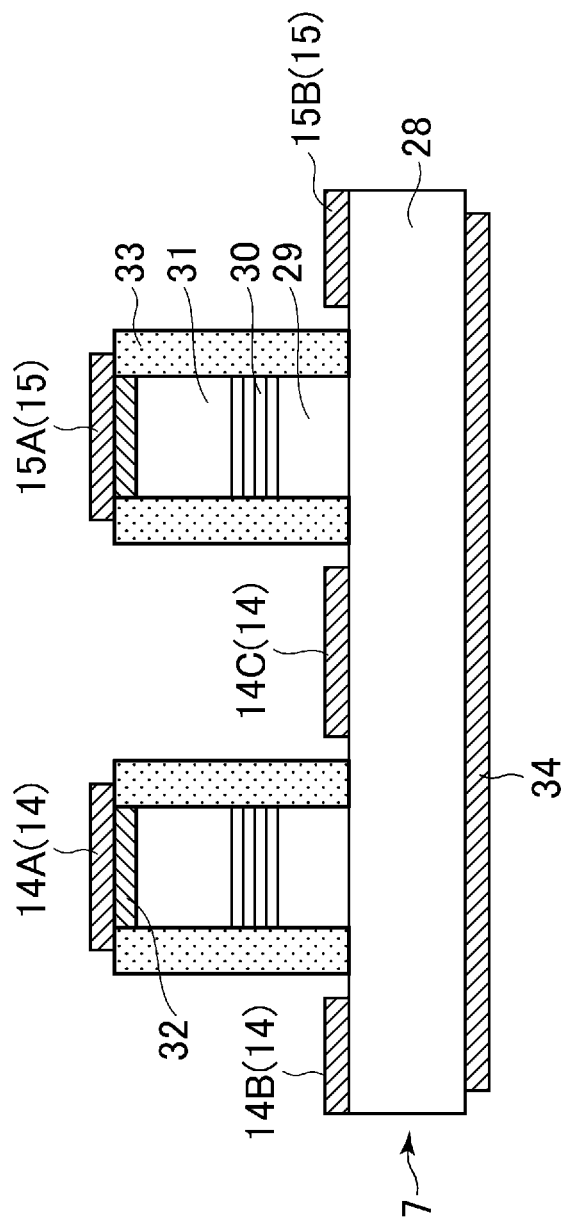
FIG. 7 is a sectional view illustrating a configuration of a large electrode in the MZ type modulation device (MZ type modulation device for zero-chirp operation) according to an embodiment of this disclosure.
Figure 8:
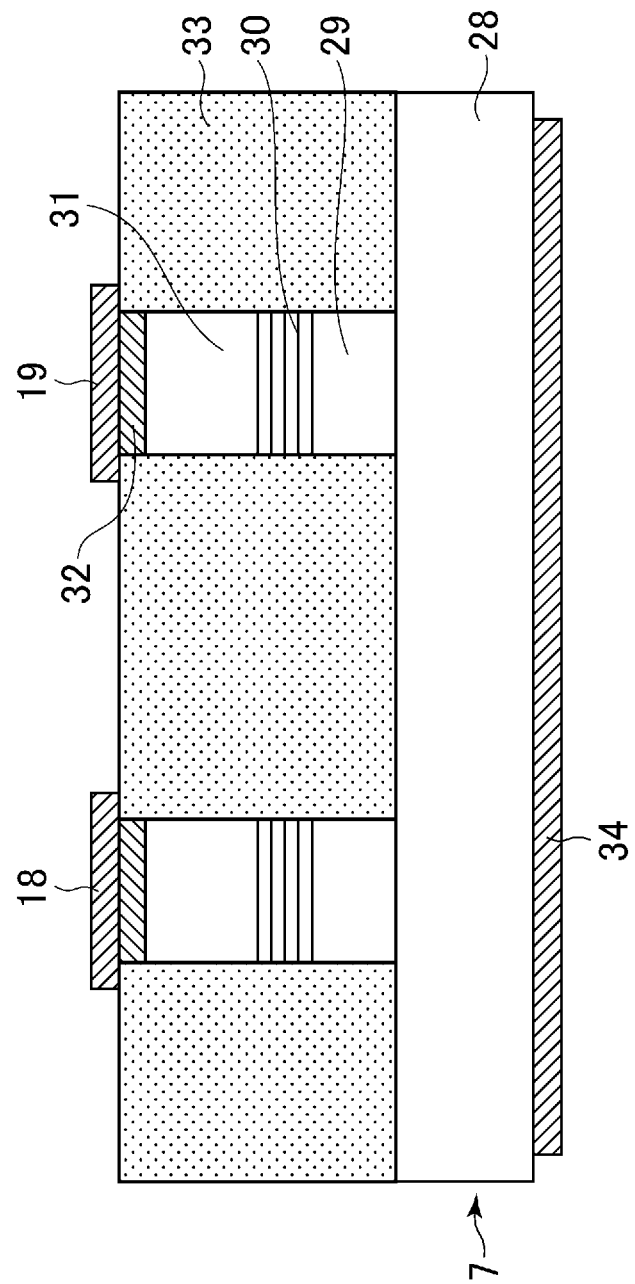
FIG. 8 is a sectional view illustrating a configuration of a small electrode in the MZ type modulation device (MZ type modulation device for zero-chirp operation) according to an embodiment of this disclosure.

FIG. 7 and FIG. 8 are sectional views illustrating sectional structures of the MZ type modulation device 7 according to this embodiment.

FIG. 7 is a sectional view of the first electrode and the second electrode. FIG. 8 is a sectional view of the short electrode.

As illustrated in FIG. 7 and FIG. 8, the MZ modulation device 7 includes, for example, a layer structure (waveguide structure) in which a buffer layer 29 that includes n-InP, a multiple-quantum well (MQW) waveguide core layer 30 that includes InGaAsP, a cladding layer 31 that includes p-InP, and a contact layer 32 that includes p-InGaAsP are sequentially layered over a substrate 28 that includes n-InP with a method such as Metal Organic Chemical Vapor Deposition (MOCVD).

As illustrated in FIG. 7 and FIG. 8, a general dry etching method is used to remove portions so that a waveguide structure that includes the MQW waveguide core layer 30 is kept only in the portion where the waveguide is formed, and the removed portions are filled with a low-dielectric resin 33 such as Benzocyclobutene (BCB).

Moreover, as illustrated in FIG. 7, the low-dielectric resin 33 formed over an area where a high-frequency electrode is formed is removed by a method such as a dry etching, and the signal electrode 14A included in the first electrode 14 and the signal electrode 15A included in the second electrode 15 are formed in the area. The signal electrode 14A and the signal electrode 15A for applying high-frequency signals are formed over the waveguide structure.

Moreover, the low-dielectric resin 33 formed over an area where a ground electrode is formed is removed by a method such as a dry etching, and in the area, a ground electrode 14B, a ground electrode 14C, and a ground electrode 15B are formed. The ground electrodes 14B, 14C, and 15B are formed alongside the signal electrode 14A and the signal electrode 15A in the area where the surface of the substrate 28 is exposed beside the waveguide structure where the signal electrode 14A and the signal electrode 15A are formed, and thereby coplanar type travelling-wave electrodes are configured.

As illustrated in FIG. 8, the low-dielectric resin 33 formed in an area where electrodes for adjusting a phase are formed is removed by a method such as a dry etching, and the short electrode 18 and the short electrode 19 are formed in the area. The short electrodes 18 and 19 are formed over the waveguide structure and make up lumped constant type electrodes.

As illustrated in FIG. 7 and FIG. 8, a ground electrode 34 is formed on the bottom surface of the substrate 28.

As a passivation film, for example, a $SiO_2$ film or a SiN film may be formed between the substrate 28 and the low-dielectric resin 33, between the waveguide structure and the low-dielectric resin 33, and over the surface of the low-dielectric resin 33.

Note that in this embodiment, the high-frequency connectors 1 and 2 and the MZ type modulation device 7 are coupled to fabricate a modulator module for negative chirp (or positive chirp) operation using the MZ type modulation device 7 for zero-chirp operation configured as described above.

In other words, according to this embodiment, as illustrated in FIG. 4, the short electrode 19 provided on the second optical waveguide 13 is coupled to the high-frequency connectors 2.

As illustrated in FIG. 4, the first electrode 14 provided on the first optical waveguide 12 is coupled to the high-frequency connectors 1.

A high-frequency power supply 35 that is installed externally supplies high-frequency signals and inversion signals of the high-frequency signals with approximately the same amplitudes to the short electrode 19 provided on the second optical waveguide 13 and the first electrode 14 provided on the first waveguide 12 via the high-frequency connector 2 and the high-frequency connector 1. An appropriate DC bias is applied to the high-frequency signals. In this case, the short electrode 19 functions as a high-frequency electrode, and may not function as an electrode for adjusting a phase.

According to this embodiment, as illustrated in FIG. 4, the MZ type modulation device 7 is disposed over the carrier 6, and the first electrode 14 of the MZ type modulation device 7 is coupled to the high-frequency connector 1 and the short electrode 19 of the MZ type modulation device 7 is coupled to the high-frequency connector 2 both via a wiring 5 formed over the carrier 6.

Figure 5:
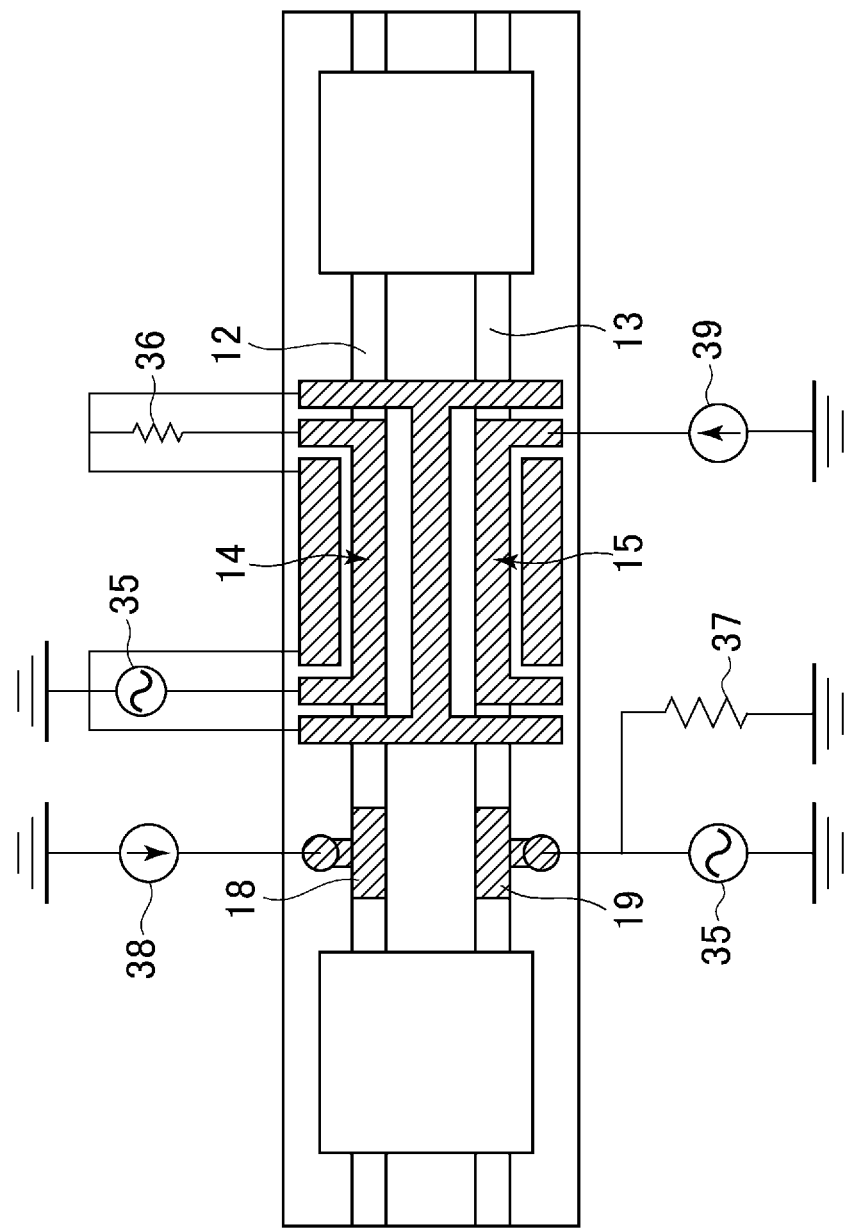
FIG. 5 illustrates a configuration of a control circuit (drive circuit) for the modulator module (optical module) for negative chirp (or positive chirp) operation manufactured using the MZ type modulation device (MZ type modulation device for zero-chirp operation) according to an embodiment of this disclosure.

As illustrated in FIG. 4 and FIG. 5, one side of a signal electrode 14A (input-side) that makes up a coplanar electrode is coupled to a part (signal wiring) 5A to which a high-frequency signal is input. The other side of the signal electrode 14A (output-side that is opposite to the input side along an axis of the optical waveguide) is coupled to a part (signal wiring) 5B that is coupled to a ground wiring 5C via a terminal resistance 36. The signal wiring 5A is coupled to the high-frequency power supply 35 via the high-frequency connector 1.

The ground electrode 14B that makes up the coplanar electrode is coupled to a ground wiring 5C, and the ground wiring 5C is grounded via the high-frequency connector 1.

Moreover, a terminal resistance (for example, about 50Ω) 36 is serially coupled between the signal electrode 14A and the ground electrode 14C. The terminal resistance 36 is configured, for example, by a thin-film resistance that couples the signal wiring 5B to which the signal electrode 14A is coupled and the ground electrode 14C to which the ground wiring 5C is coupled.

As illustrated in FIG. 4 and FIG. 5, the short electrode 19 is coupled to a part (signal wiring) 5D to which a high-frequency signal is input and the signal wiring 5D is coupled to the high-frequency power supply 35 via the high-frequency connector 2.

A terminal resistance (for example, about 50Ω) 37 is coupled in parallel to the short electrode 19. The terminal resistance 37 is, for example, configured with a thin-film resistance coupling the signal wiring 5D to which the short electrode 19 is coupled and the ground wiring 5C.

According to this embodiment, the second electrode 15 that is provided on the second optical waveguide 13 is coupled to a DC connector 3A.

The short electrode 18 provided on the first optical waveguide 12 is coupled to a DC connector 3B. Then, DC power supplies (DC current source or DC voltage supply) 38 and 39 provided externally supply different DC currents (direct currents) or DC voltages (direct current voltages) to the second electrode 15 provided on the second optical waveguide 13 and the short electrode 18 provided on the first optical waveguide 12 via the DC connector 3A and the DC connector 3B, respectively. In this case, the second electrode 15 functions as an electrode for adjusting a phase, and does not function as a high-frequency electrode.

In this way, injecting DC current to or applying DC voltage to the first optical waveguide 12 and the second optical waveguide 13 via the short electrode 18 and the second electrode 15 that functions as an electrode for adjusting a phase changes refractive indices of the first optical waveguide 12 and the second optical waveguide 13 and changes phases of optical waves that propagate through the first optical waveguide 12 and the second optical waveguide 13, and thereby allows the adjustment of a phase difference caused, for example, due to a manufacturing error. Thus, a phase difference between light propagating through the first optical waveguide 12 and the second optical waveguide 13 due to manufacturing error is adjusted by control of the amount of DC current injected or the amount of DC voltage applied.

According to this embodiment, as illustrated in FIG. 4, the MZ type modulation device 7 is disposed over the carrier 6, the second electrode 15 and the short electrode 18 of the MZ type modulation device 7 are coupled to the DC connector 3B and the DC connector 3A, respectively, via the wiring 5 formed over the carrier 6.

As illustrated in FIG. 4 and FIG. 5, the signal electrode 15A that makes up the coplanar electrode is coupled to a part (signal wiring) 5E over the carrier 6 to which a DC current or a DC voltage is input, and the signal wiring 5E is coupled to the DC power supply 39 via the DC connector 3A.

As illustrated in FIG. 4 and FIG. 5, the short electrode 18 is coupled to a part (signal wiring) 5F over the carrier 6 to which a DC current or a DC voltage is input and the signal wiring 5F is coupled to the DC power supply 38 via the DC connector 3B.

As described above, according to this embodiment, the short electrode 19 is not used as an electrode for adjusting a phase but as a high-frequency electrode. Moreover, the second electrode 15 is not used as a high-frequency electrode but as an electrode for adjusting a phase. In this way, a modulator module that performs negative chirp operation (or positive chirp operation) is achieved by providing high-frequency electrodes with different lengths for applying high-frequency signals on the first optical waveguide 12 and the second optical waveguide 13 that make up the MZ interferometer.

Particularly, according to this embodiment, as described above, amplitudes of high-frequency signal voltages applied to the first optical waveguide 12 and the second optical waveguide 13 are approximately the same, thus, a ratio of a phase change amount of light that propagates through the first optical waveguide 12 to that of the second optical waveguide 13 is determined by a ratio of the length of the first electrode 14 formed on the first optical waveguide 12 to the length of the short electrode 19 formed on the second optical waveguide 13. Therefore, a desired ratio of a phase change amount may be obtained by adjusting the length of the first electrode 14 formed on the first optical waveguide 12 and the length of the short electrode 19 formed on the second optical waveguide 13, and thereby desired negative chirp operation (or positive chirp operation) may be achieved.

Achieving a desired ratio of phase change amounts, and desired negative chirp operation (or positive chirp operation) will be described in detail as follows.

In the MZ type modulator, applying a high-frequency signal voltage to two optical waveguides (arms) that make up the MZ interferometer changes a phase of light that propagates through each waveguide which changes the condition of interference; and modulation is performed so that, for example, modulation is on when phases of both arms are aligned, and modulation is off when phases of both arms are deviated by the amount $\pi$.

The MZ type modulator allows controlling of a chirp condition of a signal light output by adjusting a drive method.

Figure 9:
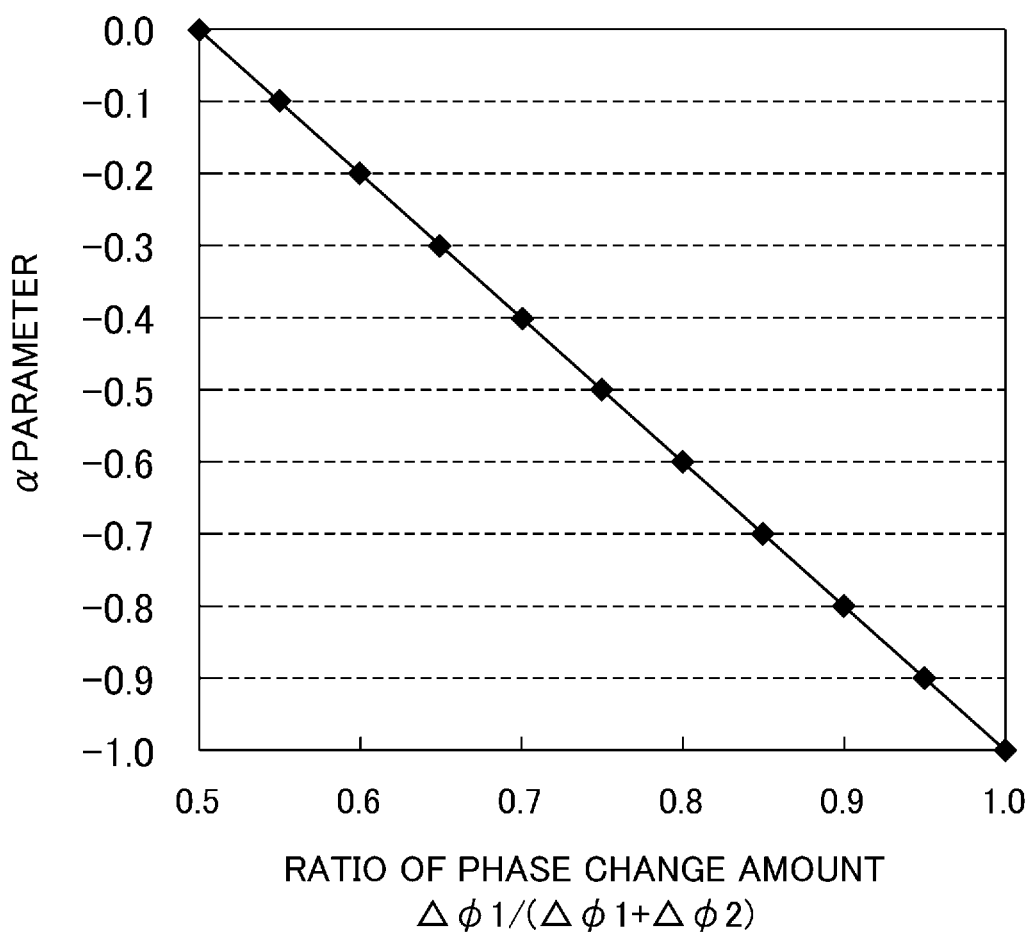
FIG. 9 illustrates relationship between a ratio of phase change amount generated at each arm of the MZ type modulator and an a parameter.

The amount of chirp may be expressed by a value of $\alpha$ parameter. The $\alpha$ parameter, for example, as illustrated in FIG. 9, changes with a ratio of a phase change amount generated at each arm. In FIG. 9, a phase change amount of one of the arms is $\Delta\phi1$, and the other one of the arms is $\Delta\phi2$, and a ratio of these phase change amounts is expressed as $\Delta\phi1/(\Delta\phi2)$.

Figure 10A:
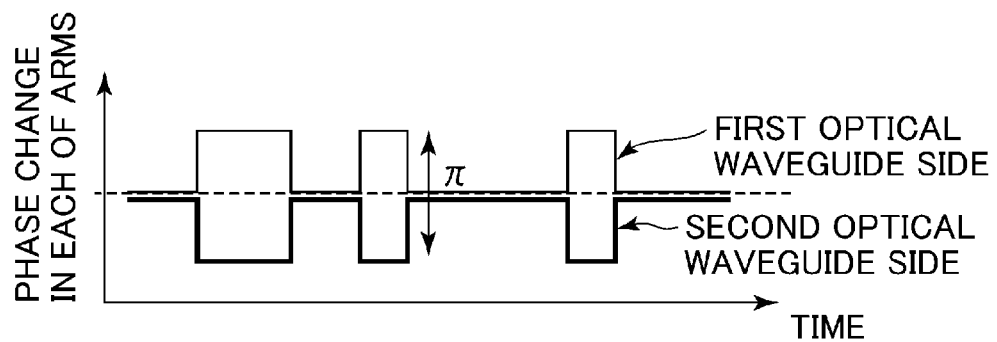
FIGS. 10A to 10C illustrate zero-chirp operation of the MZ type modulator.
Figure 10B:
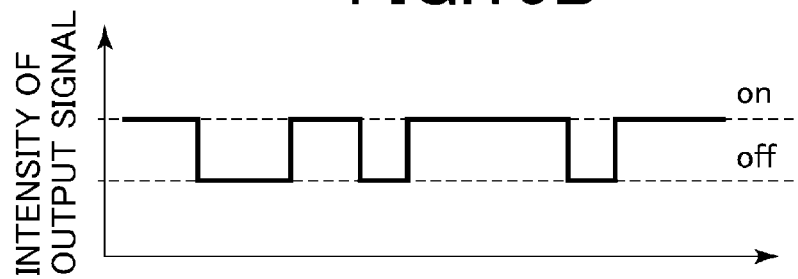
Figure 10C:
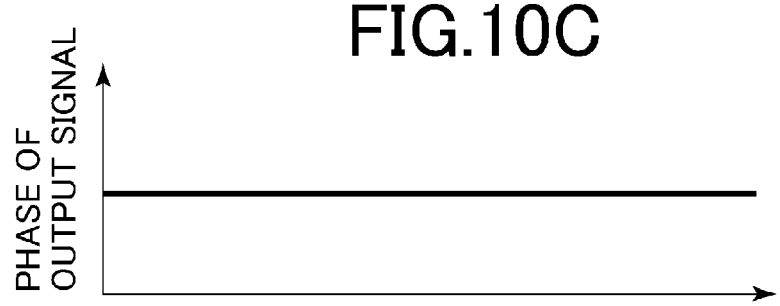

For example, as illustrated in FIG. 10A, in the following drive method, zero-chirp operation is realized. In the method, for example, starting from a condition in which phases of both arms are aligned by adjusting a DC current supplied to an electrode for adjusting a phase, the phase change amount of one of the arms is set to $+\pi/2$, and the phase change amount of the other one of the arms is set to $-\pi/2$ to obtain approximately the same phase change amounts for both arms, thereby variation of a phase difference by $\pi$ is obtained and phase change amounts of both arms are cancelled. Thus, as illustrated by FIG. 10B, when the intensity of output light (output signal) changes between "on" and "off", zero-chirp operation ($\alpha=0$) with a small phase change of output light may be obtained.

Figure 11A:
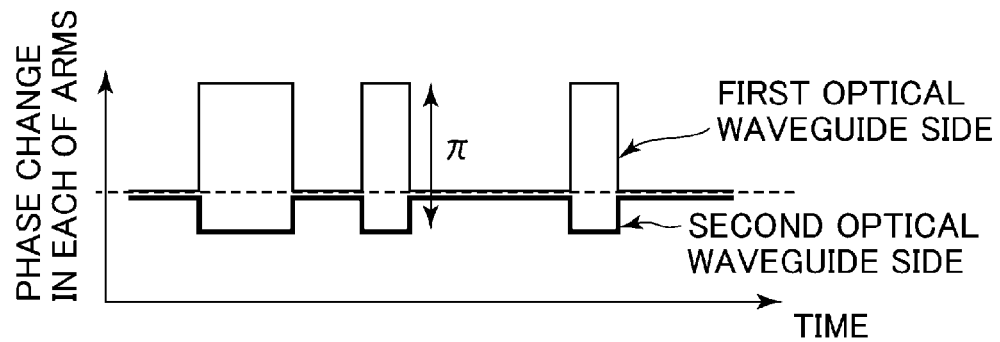
FIGS. 11A to 11C illustrate negative-chirp operation of the MZ type modulator.
Figure 11B:
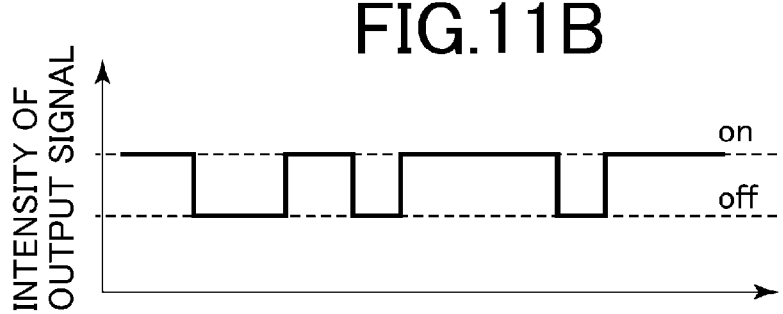
Figure 11C:
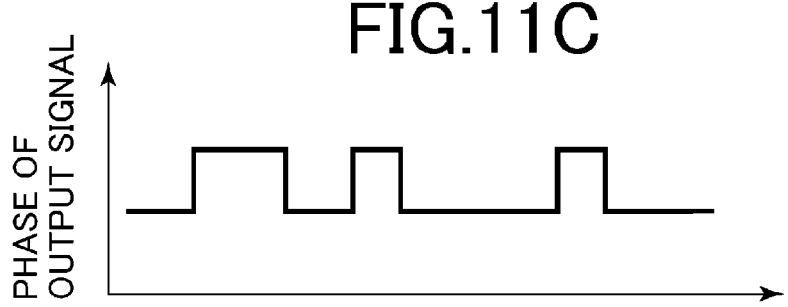

As illustrated in FIG. 11A, in the following drive method, negative chirp operation is obtained. In the method, the phase change amount of one of the arms is set to $+0.85\pi$, and the phase change amount of the other one of the arm is set to −0.15π to obtain variation of a phase difference by π. Thereby the phase change amounts of both arms are different and the phase change amounts of both arms are not cancelled out. Thus, as illustrated in FIG. 11B, when the intensity of output light (output signal) changes between "on" and "off", the phase of the output light is changed and thereby negative chirp operation ($\alpha$=negative value) in which chirp is generated is obtained. By replacing phase change amounts of each of the arms, positive chirp operation is obtained ($\alpha$=positive value).

As described above, the MZ type modulator allows adjusting the amount of chirp by changing a ratio of phase change amounts between both arms. Thus, the MZ type modulator may support both zero-chirp operation and negative chirp operation (and positive chirp operation).

Methods to adjust a ratio of phase change amounts of both arms include, for example, changing a ratio of amplitudes of high-frequency signal voltages applied to both arms.

A ratio of phase change amounts of both arms may be changed by adjusting amplitudes of high-frequency signals applied to each of the arms, because the larger the amplitude is, the larger a phase change amount becomes when a high-frequency voltage is applied.

Another method is providing electrodes for applying high-frequency signal voltages with different lengths between the two arms.

A ratio of phase change amounts of both arms may be changed by adjusting the length of an electrode for applying high-frequency signal voltage because the longer the area to which a voltage is applied, the larger a phase change amount becomes when a high-frequency signal voltage is applied.

In the above described method in which a ratio of amplitudes of high-frequency signal voltages is changed, a high-frequency signal voltage with different amplitudes is applied to each of the two arms. In this case, two separate high-frequency power supplies are used. As a result, a complicated control circuit is configured to apply high-frequency signal voltages.

Figure 12A:
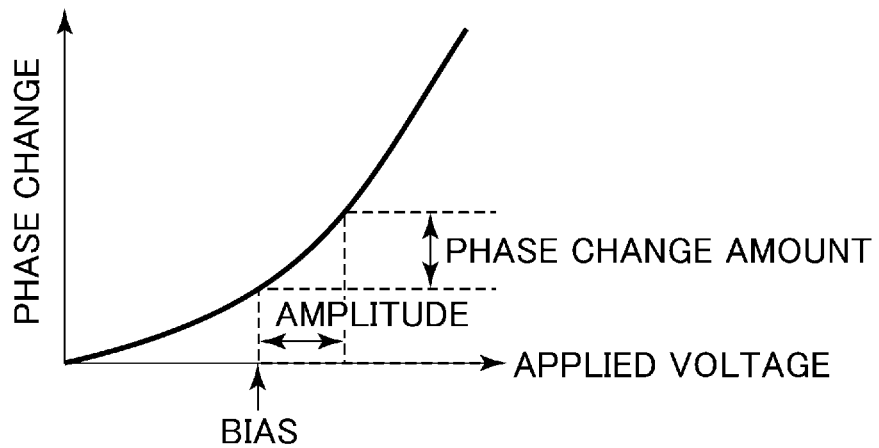
FIGS. 12A to 12C illustrate a relationship between phase change amounts and applied voltages and changes in phase change amounts depending on drive conditions when the MZ type modulator (MZ type modulation device) including semiconductor optical waveguides.
Figure 12B:
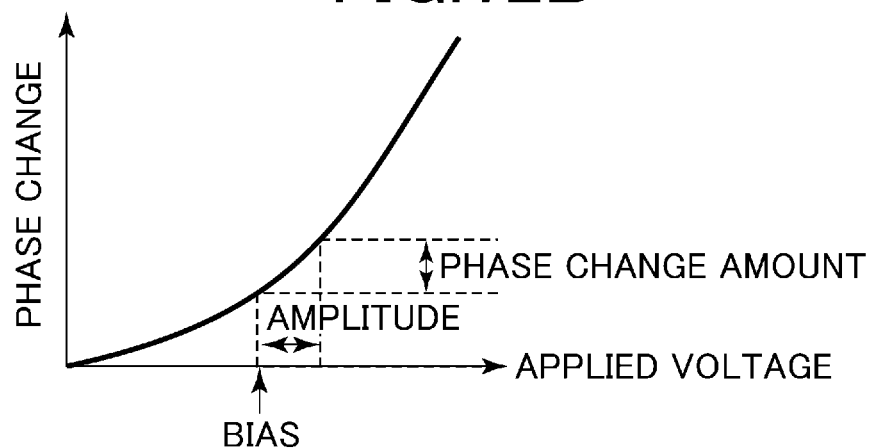
Figure 12C:
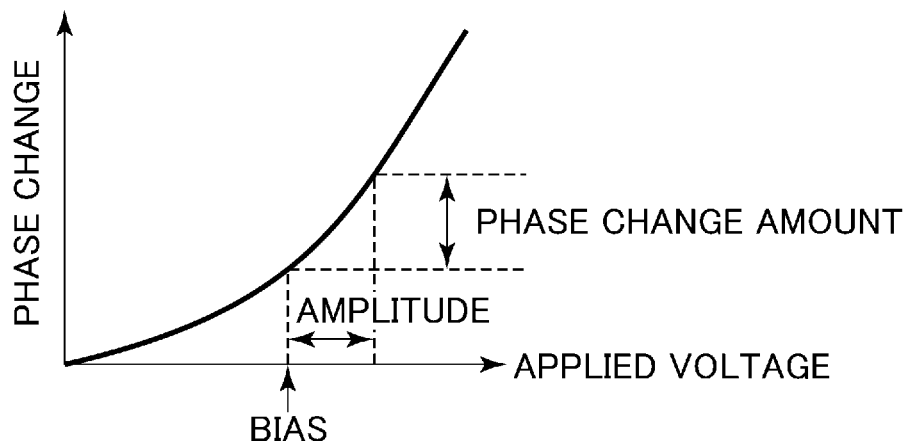

In particular, when the MZ type modulation device 7 is manufactured by semiconductor materials, a phase change for an applied voltage is nonlinear, thus not only the phase change amount changes depending on the size of an amplitude of a high-frequency signal voltage (refer to FIGS. 12A and 12B), but the phase change amount also changes depending on a value of a bias voltage (Refer to FIG. 12). Thus, the control may be more complicated.

Therefore, according to this embodiment, as illustrated in FIG. 4, the first electrode 14 (14A) and the short electrode 19 with different lengths are provided for applying high-frequency signals to the first optical waveguide 12 and the second optical waveguide 13 that make up a MZ interferometer to obtain a desired ratio of phase change amounts, and thereby a modulator module that operates in a desired negative chirp operation (or positive chirp operation) is achieved A negative chirp operation around $\alpha$=−0.7 is a frequently used condition of a negative chirp operation. According to this embodiment, as illustrated in FIG. 9, by making a ratio of the length of the short electrode (small electrode) 19 to the first electrode (large electrode or long electrode) 14 (14A) to be within a range of ⅛ to ¼ (2:18 to 4:16), a modulator module that performs negative chirp operation with the $\alpha$ parameter around −0.7 may be achieved.

As described above, adjusting a ratio of the phase change amounts by adjusting the lengths of the first electrode 14(14A) and the short electrode 19 provided on the first optical waveguide 12 and the second optical waveguide 13 respectively allows applying approximately the same amplitudes of high-frequency signals to the first optical waveguide 12 and the second optical waveguide 13, and approximately the same bias voltages as well even when a phase change in applied voltages is nonlinear. As a result, adjusting a complicated drive condition may not be required, and a simple control circuit may be configured.

Now, a method to fabricate an optical module according to this embodiment will be described.

The above described MZ type modulation device 7 for zero-chirp operation is disposed in the package 4 that includes the high-frequency connector 1, the high-frequency connector 2, and a plurality of the DC connectors.

Here, the MZ type modulation device 7 for zero-chirp operation is disposed on the carrier 6 before disposing the carrier 6 having the wiring 5 in the package 4.

The short electrode 19 provided on the second optical waveguide 13 is coupled to the high-frequency connector 2 via the wiring 5 formed over the carrier 6.

The first electrode 14 provided on the first optical waveguide 12 is coupled to the high-frequency connector 1 via the wiring 5 formed over the carrier 6.

The second electrode 15 provided on the second optical waveguide 13 is coupled to the DC connector 3A via the wiring 5 formed over the carrier 6.

The short electrode 18 provided on the first optical waveguide 12 is coupled to the DC connector 3B via the wiring 5 formed over the carrier 6.

As described above, the wiring is arranged so that high-frequency signal voltages supplied from outside of the module are applied to the long electrode side (high-frequency electrode 14 side of the MZ type modulation device 7 for zero-chirp operation) on one of the first optical waveguide 12 or the second optical waveguide 13 (in FIG. 4, the first optical waveguide 12), and to the short electrode side (the electrode 19 side for adjusting a phase of the MZ type modulation device 7 for zero-chirp operation) on the other one of the first optical waveguide 12 or the second optical waveguide 13 (in FIG. 4, the second optical waveguide 13). Accordingly, high-frequency signal voltages are applied via electrodes with different lengths on the first optical waveguide 12 and the second optical waveguide 13 that make up the MZ interferometer. As a result, when high-frequency signal voltages with approximately the same amplitudes and the inversion signals are applied to the first electrode 14 and the short electrode 19, the phase change amount of the first optical waveguide 12 of the first electrode (long electrode) 14 side is larger than that of the second optical waveguide 13. This means that the phase change amounts of the first optical waveguide 12 and the second optical waveguide 13 do not match, thus negative chirp operation (or positive chirp operation) may be achieved.

The wiring is arranged so that a DC current or a DC voltage for controlling a phase is applied to the second electrode 15 and the short electrode 18 that are not used as high-frequency electrodes.

In this manner, an optical module (modulator module) for negative chirp operation (or positive chirp operation) may be manufactured by using a MZ type modulation device 7 for zero chirp operation.

Figure 13:
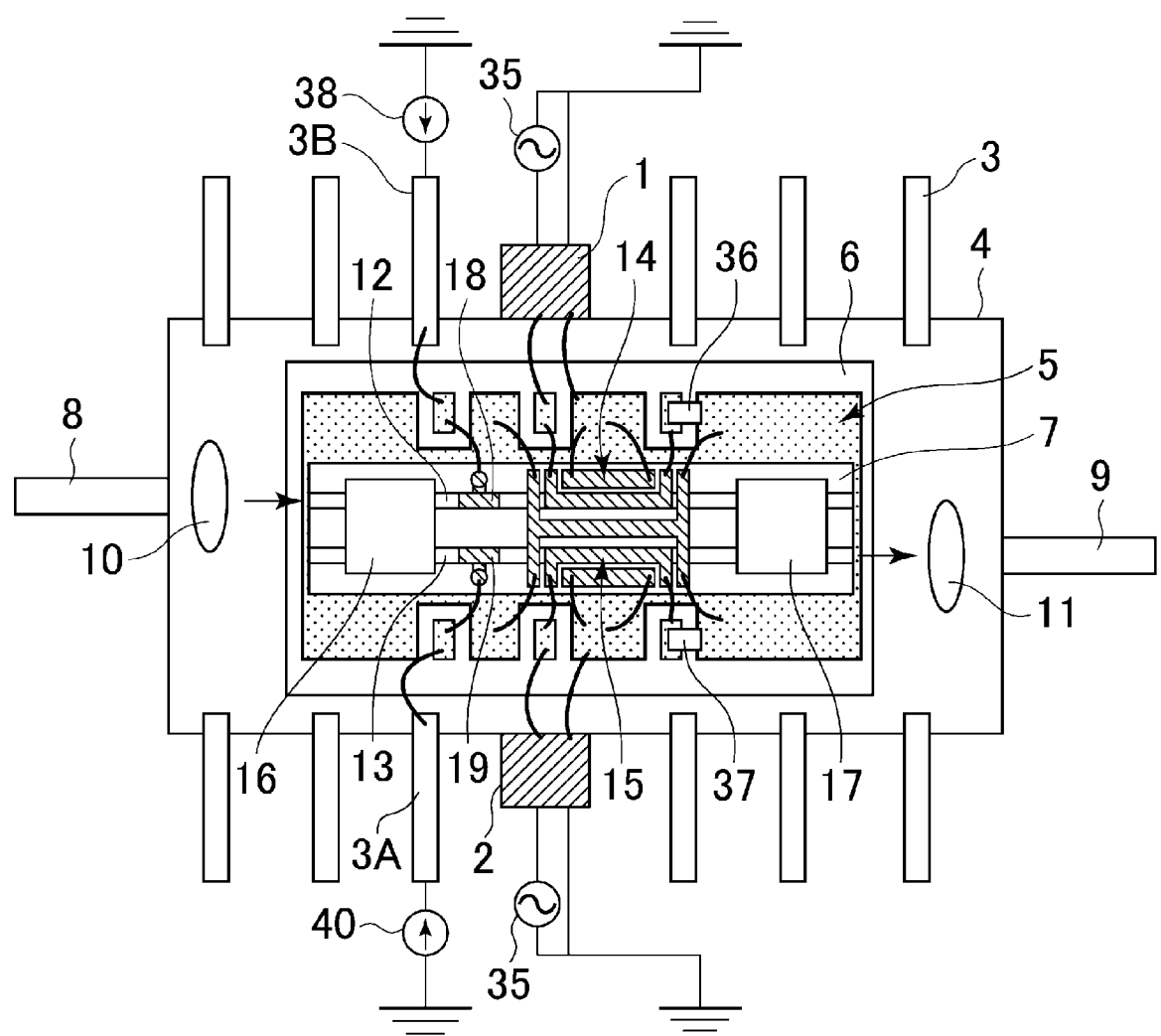
FIG. 13 is a plain view illustrating a configuration of the modulator module for zero-chirp operation (optical module) and the optical transmitter (optical modulator) manufactured using the MZ type modulation device (MZ type modulation device for zero-chirp operation) according to an embodiment of this disclosure.
Figure 14:
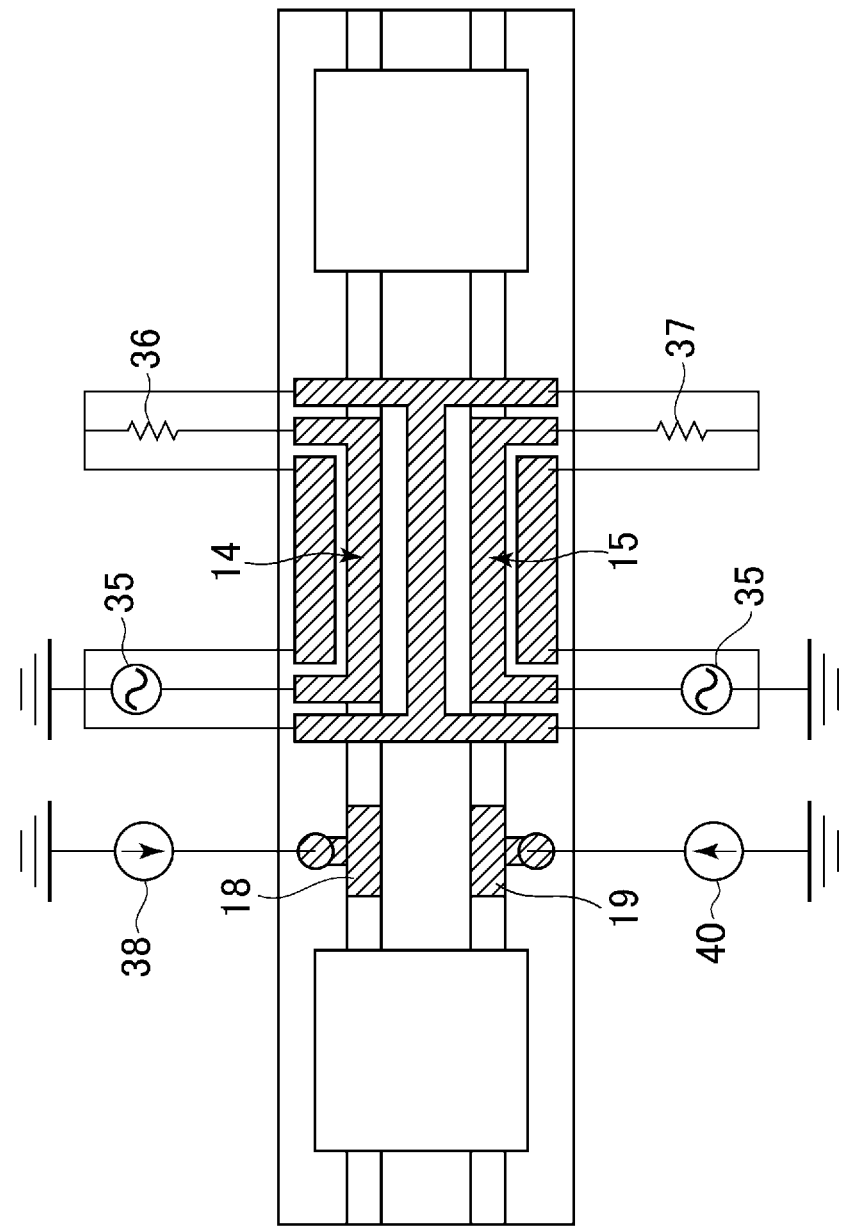
FIG. 14 illustrates a configuration of a control circuit (drive circuit) for the modulator module (optical module) for zero-chirp operation manufactured using the MZ type modulation device (the MZ type modulation device for zero-chirp operation) according to an embodiment of this disclosure.

When an optical module (modulator module) for zero-chirp operation is manufactured by using a MZ type modulation device 7 for zero-chirp operation configured as described above, as illustrated in FIGS. 13 and 14, the first electrode (high-frequency electrode or long electrode) 14 is coupled to the high-frequency connector 1 and the second electrode (high-frequency electrode, long electrode) 15 is coupled to the high-frequency connector 2 both via the wiring 5 formed over the carrier 6. Moreover, the short electrode (for adjusting a phase) 18 is coupled to the DC connector 3B and the short electrode 19 (for adjusting a phase) is coupled to the DC connector 3A both via the wiring 5 formed over the carrier 6. Note that, in FIG. 13 and FIG. 14, the same elements as in the above embodiment (refer to FIG. 4 and FIG. 5) are assigned the same reference numerals.

In other words, the wiring may be arranged so that the high-frequency power supply 35 that is provided outside of the module supplies high-frequency signals with approximately the same amplitudes and the inversion signals to the first electrode 14 and the second electrode 15 provided on the first optical waveguide 12 and the second optical waveguide 13 that make up the MZ interferometer and the lengths of the electrodes are approximately the same. Moreover, the wiring may be arranged so that DC power supplies 38 and 40 provided outside of the module supply DC currents or DC voltages to the short electrodes (electrodes for adjusting a phase) 18 and 19 whose lengths are approximately the same.

The optical modulator (optical transmitter) according to this embodiment, as illustrated in FIG. 4, includes the optical module (modulator module) as configured above, the high-frequency power supply 35 for supplying the high-frequency signal and the inversion signal, and the DC power supply 38 and the DC power supply 39 for supplying DC currents or DC voltages to adjust phases. The high-frequency power supply 35, and the DC power supplies 38 and 39 are provided outside of the module.

In other words, the optical modulator (optical transmitter) according to this embodiment includes the MZ type modulation device 7 for zero-chirp operation as configured above, the high-frequency power supply (common high-frequency power supply, high-frequency signal power supply) 35 is coupled to the short electrode 19 provided on the second optical waveguide 13 and to the first electrode 14 provided on first optical waveguide 12 so as to supply high frequency signals with approximately the same amplitudes and the inversion signals.

The optical modulator (optical transmitter) according to this embodiment includes the carrier 6 with the wiring 5 for disposing the MZ type modulation device 7 for zero-chirp operation as configured above in the package 4 that has the high-frequency connector 1 and the high-frequency connector 2.

The short electrode 19 provided on the second optical waveguide 13 is coupled to the high-frequency power supply 35 via the wiring 5 formed over the carrier 6 and the second high-frequency connector 2.

The first electrode (long electrode) 14 provided on the first optical waveguide 12 is coupled to the high-frequency power supply 35 via the wiring 5 formed over the carrier 6 and the high-frequency connector 1.

As described above, the high-frequency power supply 35 provided outside of the module supplies high-frequency signals and the inversion signals of the high-frequency signals with approximately the same amplitudes to the short electrode 19 provided on the second optical waveguide 13 and the first electrode (long electrode) 14 provided on the first optical waveguide 12 via the high-frequency connectors 1 or 2.

In the optical modulator (optical transmitter) according to this embodiment, the DC power supply 39 for supplying DC currents or DC voltages is coupled to the second electrode 15 provided on the second optical waveguide 13 of the MZ type modulation device 7, and thereby a phase of light that propagates through the second optical waveguide 13 may be adjusted.

Moreover, in the optical modulator (optical transmitter) according to this embodiment, the DC power supply 38 for supplying DC currents or DC voltages is coupled to the short electrode 18 provided on the first optical waveguide 12 of the MZ type modulation device 7, and thereby a phase of light that propagates through the first optical waveguide 12 may be adjusted.

Therefore, according to the optical module and the manufacturing method, the optical modulator, and the optical transmitter of this embodiment, zero-chirp operation and positive or negative chirp operation may be achieved with a simple control circuit and using the MZ type modulation device 7 with a similar, if not the same structure.

This means, as described above, preparing just one type of an device as a MZ type modulation device 7 may be sufficient without having to prepare MZ type modulation devices for positive or negative chirp operation including electrodes with different lengths for applying high-frequency signals. This is because a modulator module that performs negative chirp operation may be achieved by using a MZ type modulation device 7 for zero chirp operation including electrodes with approximately the same lengths for applying high frequency signals. Moreover, when manufacturing modules, the MZ type modulator modules for zero chirp operation (refer to FIG. 13), the MZ type modulator modules for positive or negative chirp operation (refer to FIG. 4) are manufactured separately and the manufacturing of these modules takes a short time. Thus, desired modules may be manufactured quickly depending on an order status for modules for positive or negative chirp operations. This is desirable in terms of a yield and inventory management.

Moreover, high-frequency signals and the inversion signals of the high-frequency signals with approximately the same amplitudes are supplied to the first optical waveguide 12 and the second optical waveguide 13 that make up the MZ type modulation device 7, thus a simple control circuit may be configured using the high-frequency power supply 35 in order to supply the high-frequency signals to drive the modulator.

Figure 1:
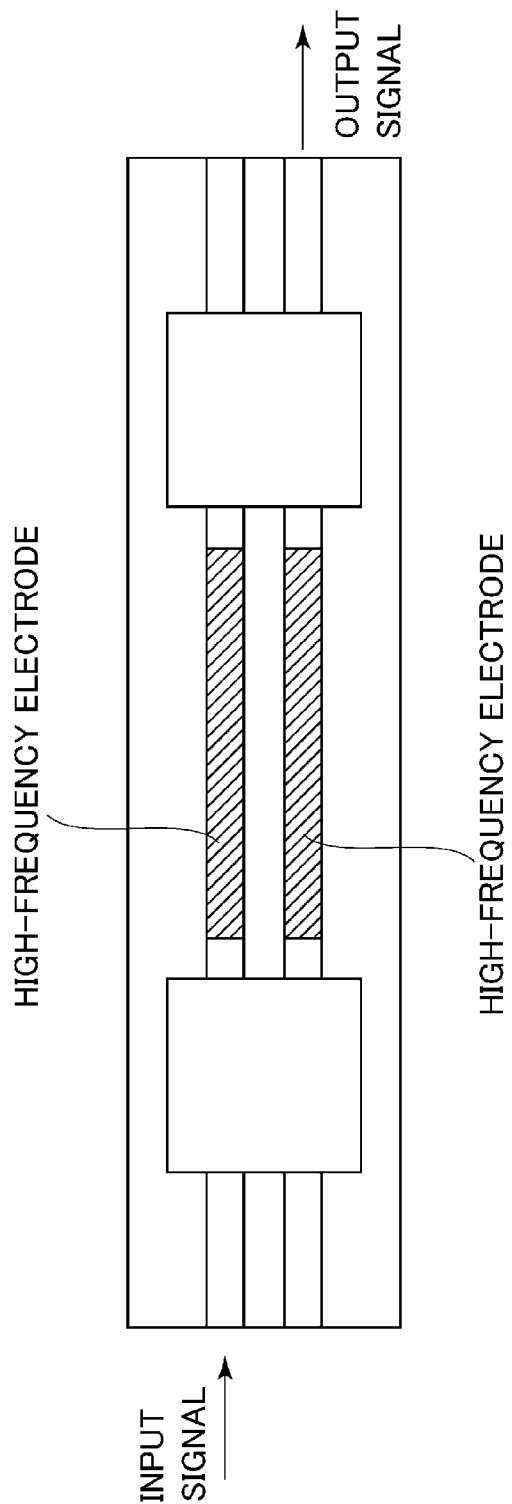
FIG. 1 illustrates a plain view of a configuration of a Mach-Zehnder (MZ) type modulator (MZ type modulation device) by a related technique.
Figure 2:
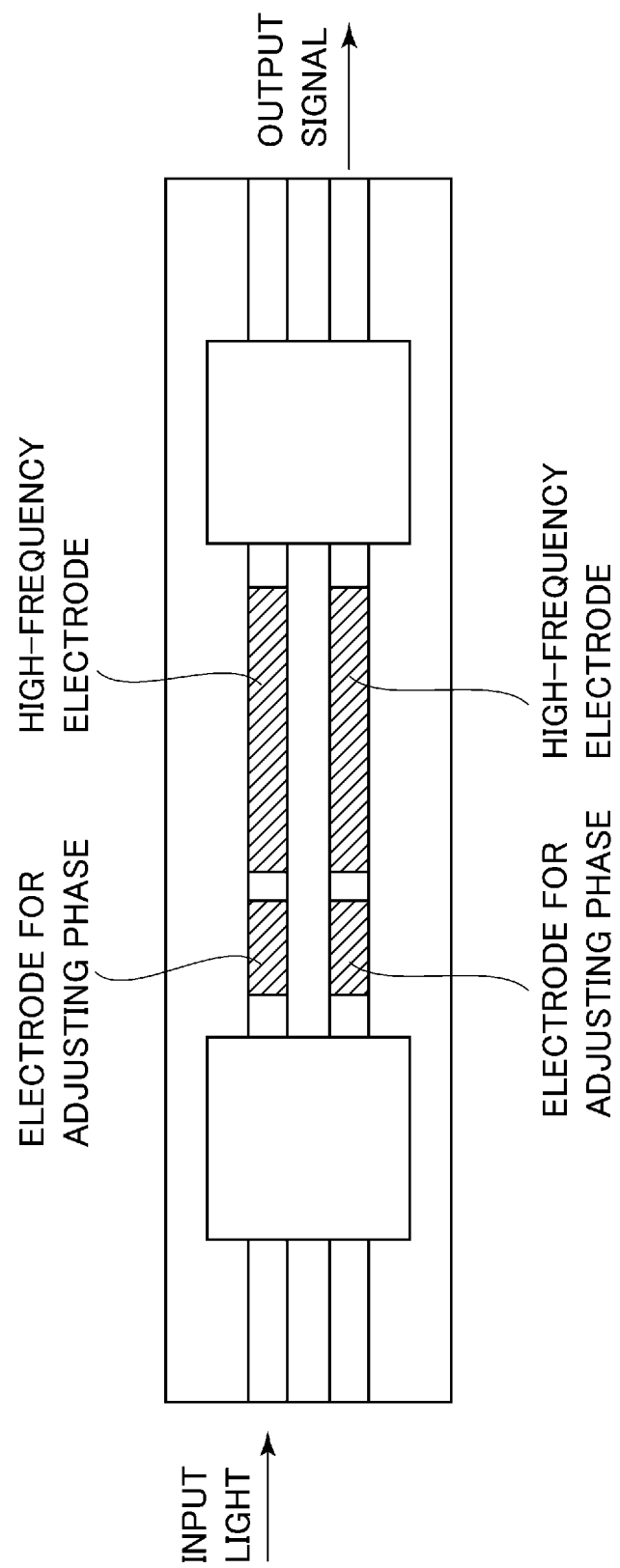
FIG. 2 illustrates a plain view of a configuration of a Mach-Zehnder (MZ) type modulator (MZ type modulation device) with electrodes for adjusting a phase by a related technique.
Figure 3:
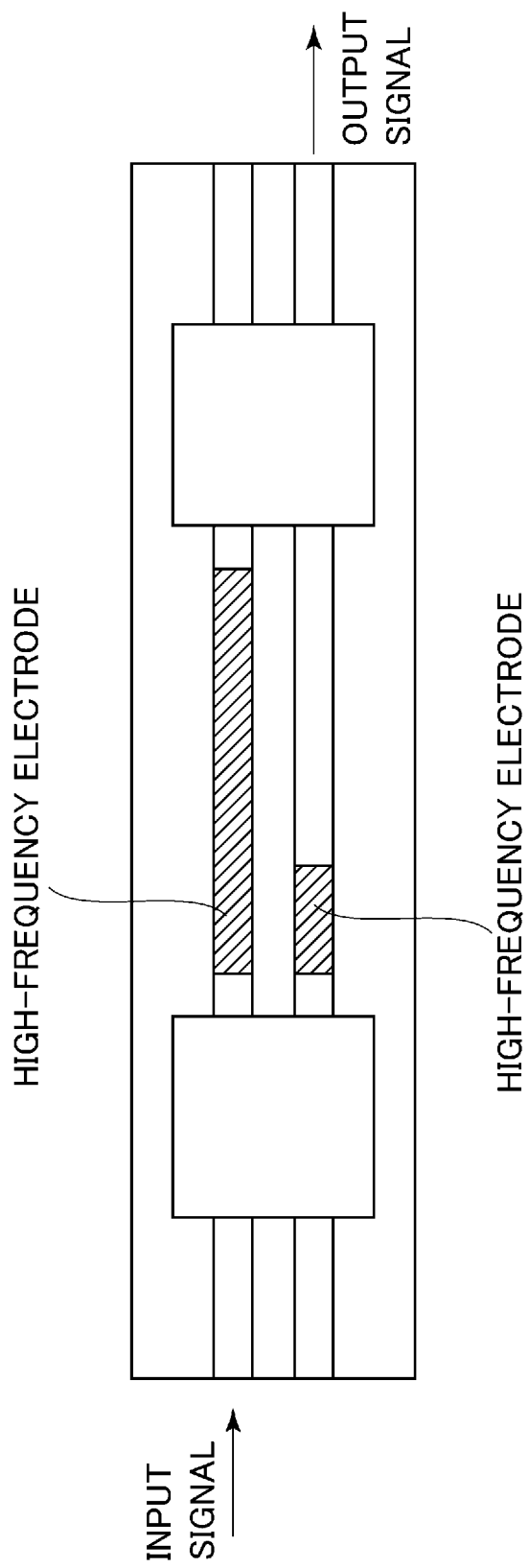
FIG. 3 illustrates a plain view of a configuration of a Mach-Zehnder (MZ) type modulator (MZ type modulation device) in which the length of electrodes is adjusted in order to control chirp by a related technique.
Figure 15:
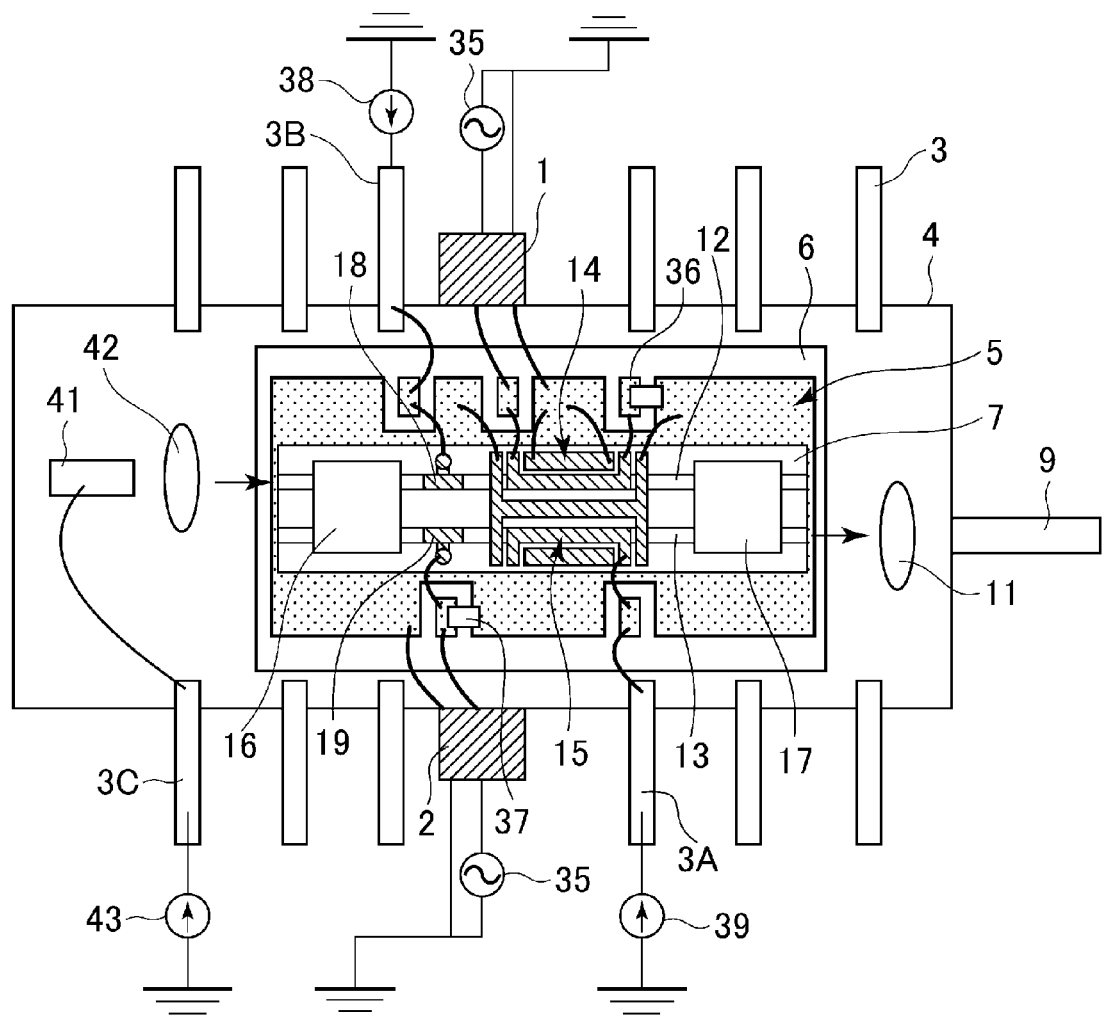
FIG. 15 is a schematic plain view illustrating an example of an alternative embodiment of a configuration of the optical module (modulator module for negative chirp (or positive chirp) operation and the optical transmitter (optical modulator) according to an embodiment of this disclosure.

For example, as illustrated in FIG. 15, a laser device 41 to input light into the MZ type modulation device 7 may be disposed in the optical module (modulator module) according to this embodiment. Disposing the laser device 41 in the modulator module allows reducing the size of the entire transmitter module including the laser, the modulator, and the control circuit compared to when a laser, a modulator, and the control circuit are prepared as separate modules. In FIG. 15, the same elements as in the above embodiment (refer to FIG. 1) are assigned the same reference numerals.

As a laser device 41, semiconductor laser devices used for a light source for optical communication may be used. Such laser elements include, for example, Distributed-Feedback (DFB) laser, Distributed-Bragg-Reflector (DBR) laser, Sampled-Grating-DBR (SG-DBR), and tunable DFB laser array.

A lens 42 for coupling light output from the laser device 41 to an input port of the MZ type modulation device (optical modulator) 7 is disposed between the laser device 41 and the MZ type modulation device (optical modulator) 7. Moreover, the laser device 41 is coupled to the DC power supply 43 via the DC connector 3C provided in the package 4.

Here, as an example, a case is described in which the MZ type modulation device 7 and the laser device 41 are configured separately and independently. However, the embodiment is not limited to this. For example, a laser device integrated with a MZ type modulator may be configured in which the laser device and the MZ type modulation device are monolithically integrated. In this case, the number of elements in the optical module is reduced and thereby easier assembly of modules and smaller size of the module may be achieved.

Here, as an example, a case in which the laser device 41 is disposed in the modulator module is described. However, the embodiment is not limited to this. For example, the modulator module or the optical modulator according to the above embodiment and a laser (for example, semiconductor laser) to input light to the optical modulator may be configured separately and independently and an optical transmitter may be configured by including the modulator module or the optical modulator and the laser.

According to the embodiment, as an example, a case is described in which the first electrode 14 and the second electrode 15 are coplanar type electrodes including ground electrodes over upper surface of the first electrode 14 and the second electrode 15. However, the embodiment is not limited to this but microstripline type electrodes that have no ground electrode over the upper surface or a lumped constant type electrode may be used. However, coplanar type electrodes are desirable because the coplanar type electrodes may operate in higher frequency bandwidths.

As described in the above embodiment, when a modulator module for negative (or positive) chirp operation is manufactured using a MZ type modulation device 7 for zero-chirp operation, the short electrodes 18 and 19 are used as high-frequency electrodes. However, the lengths of the short electrodes 18 and 19 are short, thus the short electrodes 18 or 19 may operate in sufficiently high bandwidth such as approximately 10 Gbps without using traveling-wave-type electrodes. Therefore, in the above described embodiment, the short electrodes 18 or 19 are lumped-constant type. However, the embodiment is not limited to this. The short electrodes 18 and 19 may be traveling-wave-type electrodes as in the first electrode 14 and the second electrode 15.

In the above described embodiment, as an example, a case is described in which the short electrodes 18 and 19 are disposed at the input side relative to the first electrode 14 and the second electrode 15. However, the embodiment is not limited to this, and conversely, for example, the first electrode 14 and the second electrode 15 may be disposed at the input side.

Moreover, according to the above embodiment, the MZ type modulation device 7 includes short electrodes 18 and 19 for both of the first optical waveguide 12 and the second optical waveguide 13, and the high-frequency power supply 35 is coupled to one of the short electrodes, the short electrode 19, and the DC power supply 38 is coupled to the other one of short electrodes, the short electrode 18. However, the embodiment is not limited to this.

For example, the MZ type modulation device may be configured so that the second optical waveguide is provided with the short electrode 19. In this case, when a MZ type modulator module for negative chirp operation (or positive chirp operation) is manufactured, a high-frequency power supply is coupled to the first electrode 14 and the short electrode 19, and the second electrode 15 functions as an electrode for adjusting a phase.

Moreover, for example, the MZ type modulation device may include the short electrode 18 and the short electrode 19 on both the first optical waveguide and the second optical waveguide, and a high-frequency power supply may be coupled to the short electrodes 19, and the power supply may not be coupled to the short electrodes 18. In this case, when a MZ type modulator module for negative chirp operation (or positive operation) is manufactured, the second electrode 15 functions as an electrode for adjusting a phase.

For example, the MZ type modulation device may include the short electrode 18 and the short electrode 19 on both of the first optical waveguide 12 and the second optical waveguide 13, and a high-frequency power supply may be coupled to the first electrode 14 and the short electrodes 19, and a DC power supply may be coupled to the short electrodes 15, and the power supply may not be coupled to the second electrode 19 to which the high-frequency power supply is not coupled. In this case, when the MZ type modulator module for negative chirp operation (or positive chirp operation) is manufactured, the short electrode 15 functions as an electrode for adjusting a phase.

According to the above described embodiment, DC power supplies are coupled to both a short electrode (electrode for adjusting a phase of the MZ type modulation device for zero chirp operation) and a long electrode (high-frequency electrode of MZ type modulation device for zero chirp operation) those are not used as a high-frequency electrode, and both of the long electrode and the short electrode are used as electrodes for adjusting phases. However, the embodiment is not limited to this, and a DC power supply may be coupled to one of the short electrode or the long electrode via a DC connector and the electrode may be used for adjusting a phase, because an electrode for adjusting a phase is not needed for both waveguides. In this case, using just one DC power supply is advantageous. Coupling the DC power supply to the large electrode via the DC connector allows efficient adjustment of a phase by supplying a DC current or a DC voltage.

Moreover, in the above embodiment, a case is described in which 2×2 MMI couplers are used as optical couplers for input and output. However, the embodiment is not limited to this. For example, an optical coupler of an input side may have at least one input port and two output ports (1×2 optical coupler). The optical coupler of an output side may have two input ports and at least one output port (2×1 optical coupler). A Y branch coupler, a directional coupler, or a star coupler or the like may be employed.

Moreover, according to the above described embodiment, a case is described in which a MZ type modulation device is formed over a substrate that includes InP. However, the embodiment is not limited to this. For example, the MZ type modulation device may be formed over a substrate that includes GaAs, and a similar, if not the same effect may be achieved. In the above embodiment, a case is described in which a substrate that employs conductive InP is used. However, the embodiment is not limited to this, and for example, a semi-insulated semiconductor substrate may be employed.

According to the above described embodiment, a MZ type modulation device including a waveguide structure using InGaAsP type semiconductor material is described. However, the embodiment is not limited to this. For example, the MZ type modulation device may be configured with a waveguide structure using other semiconductor material such as an AlGaInAs type, or a GaInNAs type. A waveguide core layer may be configured with a structure other than a multi-quantum well (MQW) layer.

Moreover, according to the above embodiment, a case is described in which a structure that fills the sides of an optical waveguide core layer (sides of a mesa structure) with a low-dielectric resin such as Benzocyclobutene (BCB) is employed. However, the embodiment is not limited to this. For example, a structure that fills the sides of a waveguide core layer with semiconductor material (for example, InP) may be employed.

According to the above embodiment, a case is described in which a high-frequency signal is coupled to a terminal resistance. However, the embodiment is not limited to this. For example, a capacitive terminal may be employed as well.

In the modulator module according to the above embodiment, a condenser, etc., may be disposed over the carrier as a measure against electrical noise.

A case is described in which a high-frequency power supply is employed to supply a high-frequency signal with DC bias. However, the embodiment is not limited to this. For example, a DC connector for a bias may be provided in the package besides the high-frequency connector. Then, a high-frequency signal is provided via the high-frequency connector together with a DC bias via the DC connector for a bias; thus the DC bias may be applied to the high-frequency signal in the package.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. An optical module comprising:
    a first optical coupler including at least one input port and a first output port and a second output port;
    a second optical coupler including at least a first input port and a second input port, and at least one output port;
    a first optical waveguide, one end of which is coupled to the first output port and the other end of which is coupled to the first input port;
    a second optical waveguide one end of which is coupled to the second output port and the other end of which is coupled to the second input port;
    a first electrode provided on the first optical waveguide;
    a second electrode provided on the second optical waveguide;
    a short electrode shorter than the first and second electrodes and provided on the second optical waveguide; and
    a first high-frequency connector and a second high-frequency connector;
    wherein, the short electrode provided on the second optical waveguide is provided with a second high-frequency signal from the second high-frequency connector; and
    the first electrode provided on the first optical waveguide is provided with a first high-frequency signal from the first high-frequency connector.

2. The optical module according to claim 1, further comprising: a DC connector, wherein the second electrode provided on the second optical waveguide is coupled to the DC connector.

3. The optical module according to claim 1, further comprising; another short electrode provided on the first optical waveguide.

4. The optical module according to claim 3, further comprising: another DC connector, wherein the short electrode provided on the first optical waveguide is coupled to the another DC connector.

5. The optical module according to claim 1, wherein the first electrode and the second electrode are a traveling-wave-type.

6. The optical module according to claim 1, wherein the short electrode provided on the second waveguide is a lumped-constant type or a traveling-wave-type.

7. The optical module according to claim 1, wherein a ratio of length of the short electrode to the first and second electrodes is within a range of $1/5$ to $1/4$.

8. The optical module according to claim 1, wherein the first high-frequency connector and the second high-frequency connector are provided in a package.

9. The optical module according to claim 1 further comprising: a laser device.

* * * * *